US009075762B2

(12) United States Patent
Lahousse et al.

(10) Patent No.: US 9,075,762 B2
(45) Date of Patent: *Jul. 7, 2015

(54) SETTING COPY PERMISSIONS FOR TARGET DATA IN A COPY RELATIONSHIP

(71) Applicant: International Business Machines Corporation, Armonk, NY (US)

(72) Inventors: Bruno R. Lahousse, Montpellier (FR); Alan G. McClure, Sahuarita, AZ (US); Terry O'Connor, High Peak (GB)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 174 days.

This patent is subject to a terminal disclaimer.

(21) Appl. No.: 13/734,755

(22) Filed: Jan. 4, 2013

(65) Prior Publication Data

US 2014/0195751 A1    Jul. 10, 2014

(51) Int. Cl.
*G06F 12/00* (2006.01)
*G06F 12/16* (2006.01)
*G06F 3/06* (2006.01)
*G06F 11/14* (2006.01)
G06F 13/00 (2006.01)
G06F 11/20 (2006.01)

(52) U.S. Cl.
CPC .............. *G06F 12/16* (2013.01); *G06F 3/0619* (2013.01); *G06F 3/065* (2013.01); *G06F 3/067* (2013.01); *G06F 11/1461* (2013.01); G06F 11/2071 (2013.01); G06F 2201/82 (2013.01); G06F 2201/825 (2013.01); G06F 2201/84 (2013.01)

(58) Field of Classification Search
CPC ............ G06F 11/1446; G06F 11/1448; G06F 11/1451; G06F 11/1453; G06F 11/1458; G06F 11/1461; G06F 11/1464; G06F 11/1466; G06F 11/1469
USPC .......................... 711/100, 154, 162, 163, 170
See application file for complete search history.

(56) References Cited

U.S. PATENT DOCUMENTS

| | | | |
|---|---|---|---|
| 5,933,825 A | * | 8/1999 | McClaughry et al. ................. 1/1 |
| 7,870,353 B2 | * | 1/2011 | Correl ............................ 711/162 |
| 7,877,628 B2 | * | 1/2011 | Boyd et al. ....................... 714/13 |

(Continued)

OTHER PUBLICATIONS

IBM Corp., "Discrete Remote Mirroring: Cost Effective Remote Mirroring with Disk Subsystem Based Incremental Instant Copies", IP.com PriorArtDatabase, Technical Disclosure, IP.com No. IPCOM000131726D, Nov. 17, 2005, pp. 1-3.

(Continued)

*Primary Examiner* — Tuan Thai
(74) *Attorney, Agent, or Firm* — David W. Victor; Konrad Raynes Davda & Victor LLP

(57) ABSTRACT

Providing a computer program product, system, and method for setting copy permissions for target data in a copy relationship. Source data is copied from a first storage to a first data copy in a second storage. A request is received to copy requested data from the first data copy to a second data copy. The second copy operation is performed to copy the requested first data copy form the second storage to a second data copy in response to determining that the requested first data copy is not in the state that does not permit the copying. The request is denied in response to determining that the requested first data copy is in the state that does not permit copying.

18 Claims, 4 Drawing Sheets

(56) References Cited

U.S. PATENT DOCUMENTS

2008/0065843 A1  3/2008  Bartfai et al.
2009/0070528 A1  3/2009  Bartfai et al.
2012/0011328 A1  1/2012  Burton et al.

OTHER PUBLICATIONS

N. Clayton, "Global Mirror Whitepaper", IBM Corporation, Version V2, Sep. 15, 2008, pp. 1-30.

B. Dufrasne, et al., "DS8000 Copy Services for IBM System z", Redbooks, Document No. SG24-6787-04, Feb. 2009, pp. 1-876.

B. Dufrasne, et al., "IBM System Storage DS8000: Remote Pair FlashCopy (Preserve Mirror)", Redpaper, Document No. RDEP-4504-00, May 2009, pp. 1-56.

F. Kyne, et al., "GDPS Family an Introduction to Concepts and Capabilties", Redbooks, Document No. SG24-6374-07, Jul. 2012, pp. 1-288.

* cited by examiner

Consistency Session Instance

Master Session Instance

SETTING COPY PERMISSIONS FOR TARGET DATA IN A COPY RELATIONSHIP

BACKGROUND OF THE INVENTION

1. Field of the Invention

The present invention relates to a computer program product, system, and method for setting copy permissions for target data in a copy relationship.

2. Description of the Related Art

In a storage environment, production volumes at a primary storage site may be copied to volumes in a secondary storage site to provide redundant copies of data. In the International Business Machine Corporation's ("IBM") z/OS® Global Mirror, data is asynchronously copied from the primary storage site to the secondary storage site. Data may be copied in consistency groups, such that copied data is consistent as of a point-in-time. In a consistency group, the order of dependent writes is preserved in the copying of the data. (z/OS is a registered trademark of IBM in the United States and other countries)

The target data at the secondary site, to which the source data at the primary storage site is copied, may be copied to a third copy at the secondary site using point-in-time ("PiT") copy techniques, such as the IBM FlashCopy® (FlashCopy is a registered trademark of IBM). In this way the target data in the copy relationship with the source data at the primary site becomes the source data for the PiT copy to the third copy. In other implementations, such as IBM Global Copy, the third copy may be in a third site.

There is a need in the art for improved techniques for managing the copy of the target data at the secondary site to an additional copy.

SUMMARY

Providing a computer program product, system, and method for setting copy permissions for target data in a copy relationship. A first copy operation copies source data from a first storage to a first data copy in a second storage. A request is received to perform a second copy operation to copy requested data from the first data copy in the second storage to a second data copy, wherein the requested data comprises the first data copy of the first copy operation. A determination is made as to whether the requested first data copy is in a state that does not permit copying in response to receiving the request. The second copy operation is performed to copy the requested first data copy form the second storage to a second data copy in response to determining that the requested first data copy is not in the state that does not permit the copying. The request is denied in response to determining that the requested first data copy is in the state that does not permit copying.

DETAILED DESCRIPTION

Described embodiments provide techniques for indicating that target data or a first data copy, in a second storage in a copy relationship, e.g., consistency session, with source data in a first storage is in a state that does not permit copying, such as using the target data (first data copy), in the consistency session as source data to copy to a second data copy. A session integrity lock for the consistency session may be set to indicate that the first data copy, e.g., target data, in the consistency session is in a state that does not permit copying upon detecting that the source-target data in the copy relationship is not at a recoverable point. Further, a user settable session copy lock may allow a user or program to indicate that the first data copy in a consistency session is not to be copied independent of the session integrity lock. This allows the user to specify that a first data copy in a copy relationship is not to be copied to a second data copy if the user is utilizing the data in the consistency session in the first data copy.

Figure 1:
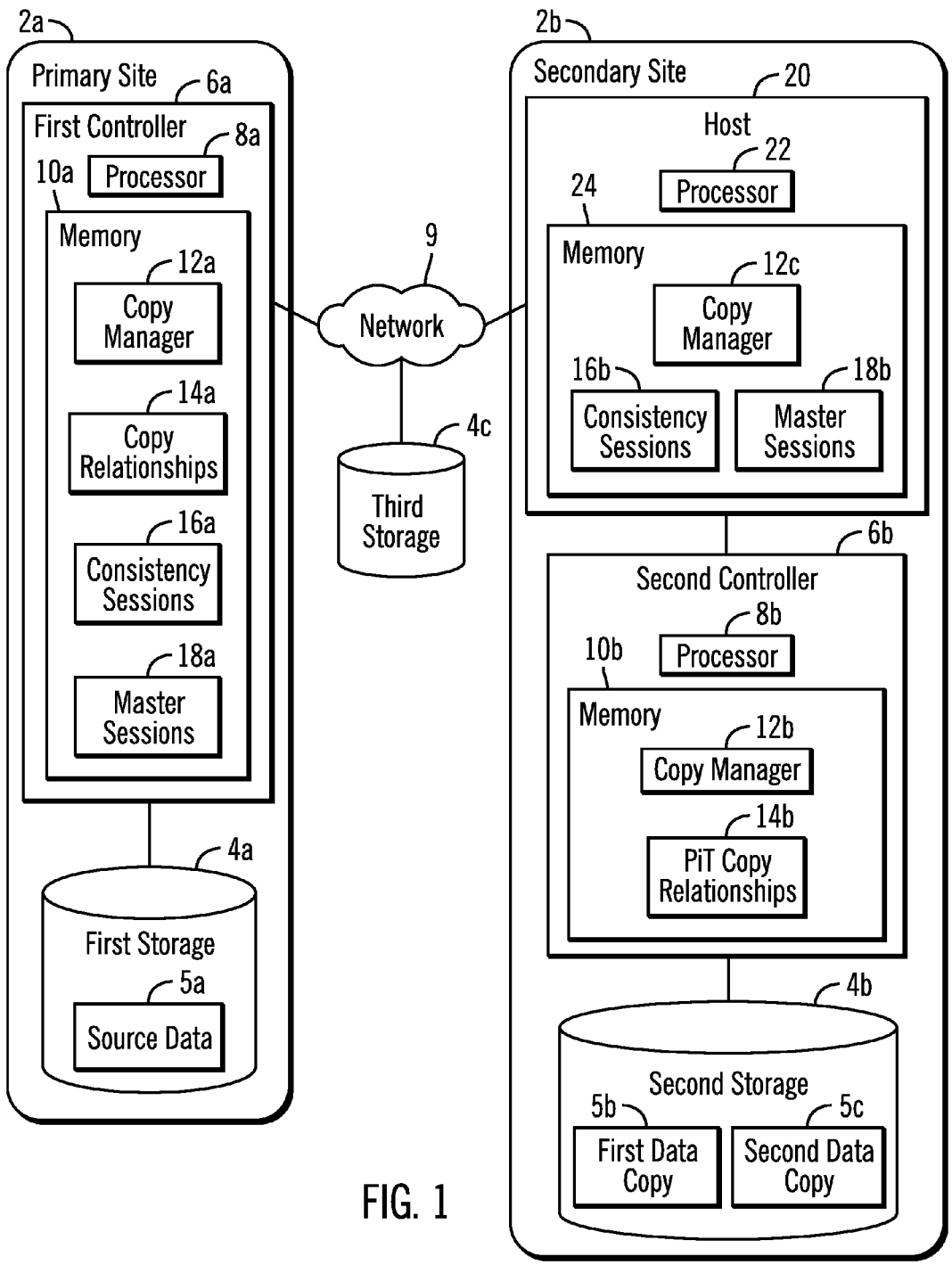
FIG. 1 illustrates an embodiment of a storage replication environment.

FIG. 1 illustrates an embodiment of a data replication environment having a primary site 2a and a secondary site 2b, where source data 5a maintained in a first storage 4a in the primary site 2a may be replicated to a target first data copy 5b in a second storage 4b using a first copy operation, where data is synchronized from the first storage 4a to the second storage 4b. The first data copy 5b in the second storage 4b may be copied to a second data copy 5c in the second storage 4b as part of a second copy operation, such as a point-in-time copy operation, e.g., FlashCopy, snapshot, etc. The data 5a, 5b, 5c may comprise volumes or other units of data. The sites 2a, 2b may further include first 6a and second 6b controllers, respectively, to manage Input/Output (I/O) access to the corresponding storages 4a, 4b. The secondary site 2b further includes a host 20 to manage the copying of the source data 5a to the first data copy 5b. The second storage controller 6b manages the copying of data from the first data copy 5b to the second data copy 5c. The sites 2a, 2b may be in a same physical or geographical location and/or in different geographical locations. Further, the sites 2a, 2b may be implemented in a same computer node or different computer nodes.

Each controller 6a, 6b includes a processor 8a, 8b and a memory 10a, 10b including a copy manager 12a, 12b. Hosts (not shown) may direct read and write requests to the first controller 6a to access the source 5a data in the first storage 4a. A host write to the source data 5a in the first storage 4a in a copy relationship, such as a consistency session, may result in the copying of the update data to the first data copy 5b, e.g., target data, in the second storage 4b. The controllers 6a, 6b and host 20 may communicate over a network 9.

The host 20 includes a processor 22 and a memory 24 into which programs are loaded for the processor 22 to execute, including a copy manager 12c.

The copy manager 12a at the first controller 6a may copy the source data 5a from the first storage 4a to the first data copy 5a in the second storage 4b as specified in a copy relationship 14a. A copy relationship 14a may identify source volumes as the source data 5a in the first storage 4a to copy to target volumes, e.g., first data copy 5b, in the second storage 4b. The data to copy in the copy relationship 14a may be part of a consistency session or consistency group, such that data is copied in a manner to maintain consistency across all dependent data, so that the order of dependent writes is preserved to make the data consistent as of a point-in-time.

In one embodiment, the host 20 copy manager 12c manages the copying of the source data 5a to the first data copy 5b at the secondary site 2b. The copy managers 12a, 12c maintain consistency sessions 16a, 16b having information on consistency sessions having source data 5a in the first storage 4a to copy to the first data copy 5b in the second storage 4b as part of a copy relationship 14a, such that updates to the source data 5a in the first storage 4a are copied to the first data copy 5b, e.g., target data, in the second storage 4b and master sessions 18a, 18b having information on master sessions.

The copy manager 12a maintains consistency session 16a information indicating data in the consistency session that needs to be copied, which data may be part of an initial copy of all the data in the consistency session 16a and updated data, so that the updated data is copied to the first data copy 5b in the second storage 4b. The copy manager 12a communicates with the copy manager 12c in the host 24 to copy data as part of a consistency session 16a, 16b. Updates to the source data 5a are stored in the memory 10a. The copy manager 12a asynchronously offloads the updates from the memory 10a through the network 9 to the copy manager 12c in the host 20. The copy manager 12c maintains consistency session information 16b to write the updates to the first data copy 5b with consistency via the second controller 6b. Write updates to the first storage 4a from a connected host (not shown) do not have to wait for the offload process to the copy manager 12c to complete.

The copy manager 12b in the second storage controller 6b maintains PiT copy relationship information 14b providing information on PiT copies from the first data copy 5b to the second data copy 5c in the second storage 4b, so that data copied from the first storage 4a to the second storage 4b is further copied as part of a PiT copy operation to the second data copy 5c.

The copy manager 12b in the second controller 6b may implement a PiT program such as
IBM FlashCopy, snapshot, and other PiT programs, to perform a PiT copy operation between the first data copy 5b and the second data copy 5c in the second storage 4b. The copy manager 12b maintains the PiT copy relationships 14b identifying the source data in the first data copy 5b in the second storage 4b subject to being copied as part of a PiT copy to identified corresponding target data in the second data copy 5c. The PiT copy relationship 14b may further include a PiT bitmap indicating the source data, e.g., the first data copy 5b in the second storage 4b, that has been copied to the second data copy 5c in the second storage 4b, so that the data as of the point-in-time comprises the first data copy 5b in the second storage 4b and the PiT source data copied to the second data copy 5c before being updated. The PiT copy relationship 14b may be configured with a background copy operation to copy all source data in the relationship in the first data copy 5b to the second data copy 5c in the second storage 4b in the background. When source data is copied as part of the background operation, the bit for that copied source data in the PiT bitmap is updated to indicate that the sourced data as of the point-in-time resides in the target data in the second storage 4b.

In an alternative embodiment, the second data copy 5c may be at a third storage 4c site. If the second data copy 5c is at a third storage 4c site, then the copy manager 12b may have to switch to synchronous copy and suspend the data copy process to the second data copy 5c.

The copy managers 12a, 12b, 12c are shown in FIG. 1 as program code loaded into the memories 10a 10b, and 24 and executed by the processors 8a, 8b, 22, respectively. Alternatively, some or all of the functions of these programs may be implemented in hardware devices in the controllers 6a, 6b and host 20, such as in Application Specific Integrated Circuits (ASICs), Field Programmable Gate Array (FPGA), etc.

The memories 10a, 10b 24 may comprise one or more volatile or non-volatile storage devices, such as a Dynamic Random Access Memory (DRAM), Random Access Memory (RAM) or a non-volatile memory, e.g., battery backed-up Random Access Memory (RAM), static RAM (SRAM), solid state storage devices (SSDs), etc.

The storages 4a, 4b may store tracks in a Redundant Array of Independent Disks (RAID) configuration where strides of tracks are written across multiple storage devices comprising the storages 4a, 4b. Strides comprise tracks written across disks in a RAID rank, where a stride of track includes data and parity information calculated form the data in the stride striped across the storage devices. A RAID rank comprises a group of storage devices configured to work as a RAID set, such that the stride of tracks, including data and parity tracks, are striped across the storage devices in the RAID rank. The storages 4a, 4b may include one or more configured RAID ranks The storages 4a, 4b may each comprise one or more storage devices known in the art, such as interconnected storage devices, where the storage devices may comprise hard disk drives, solid state storage device (SSD) comprised of solid state electronics, such as a EEPROM (Electrically Erasable Programmable Read-Only Memory), flash memory, flash disk, Random Access Memory (RAM) drive, storage-class memory (SCM), etc., magnetic storage disk, optical disk, tape, etc. The network 9 may comprise a network such as a Local Area Network (LAN), Storage Area Network (SAN), Wide Area Network (WAN), peer-to-peer network, wireless network, etc. Further the network 9 may be separated into separate networks between the controller 6a and the host 20.

Figure 2:
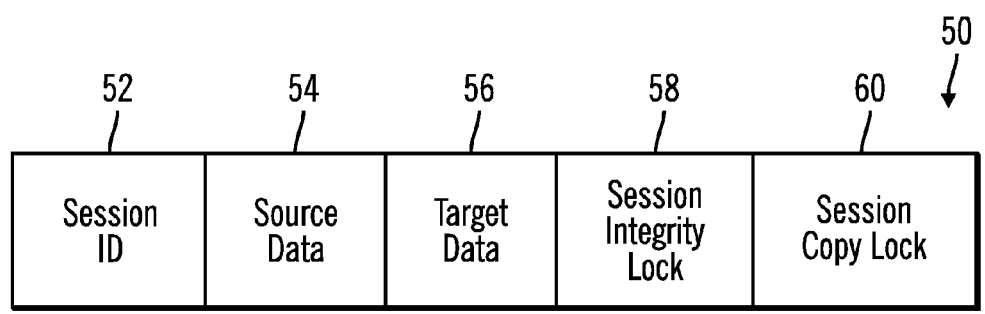
FIG. 2 illustrates an embodiment of a consistency session instance.

FIG. 2 illustrates a consistency session instance 50 maintained for one consistency session in the consistency sessions 16a, 16b. The consistency sessions 16a, 16b may include multiple consistency session instances 50, one for each consistency session established between source data in the first storage 4a to copy to target data in the second storage 4b. The consistency session instance 50 includes a session identifier (ID) 52, source data 54, such as one or more volumes in the source data 5a in the first storage 4b; target data 54, e.g., first data copy 5b, such as one or more volumes in the second storage 4b to which the source data 54 is copied; a session integrity lock 58 indicating whether the target data 56, e.g., first data copy 5b, in the consistency session 52 is at a valid recovery point, such as consistent as of a point-in-time; and a user settable session copy lock 60 indicating that target data 56 in the first data copy 4b for the session 50 may not be used as source data for a copy operation, such as a PiT copy operation to the second data copy 5c. The source 54 and target 56 data for a session instance 50 may comprise one or more volumes in the storages 4a, 4b, a set of extents or blocks, or other units of data.

The session integrity lock 58 may be set to indicate that the data in the consistency session is not at a valid recovery point if the copy manager 12c detects one of: that there is an ongoing synchronization or resynchronization operation between the source data 54, e.g., source data 5a, and target data 56, e.g., first data copy 5b, for the session 52; that there has been a suspension of the disk or storage having the source data 54 and target data 56; that a pair of source 54 and target 56 disks have been deleted; and that a request to move a consistency session to a different session is initiated.

The session copy lock 60 indicates whether a copy operation, such as a PiT copy, may be performed with respect to a target of the PiT copy, such as a third storage 4c. The copy manager 12c may implement a setlock command with a parameter identifying the consistency session 50 to which the setlock command applies and a parameter indicating whether the command is to obtain or release the session copy lock 60. A user or program would submit a setlock obtain command for a specified consistency session 50 to set the session copy lock 60 for the specified session to prevent the target data 56 in the specified session 50 from being copied.

A user or program would submit a setlock release command for a specified consistency session to set the session copy lock 60 for the specified session to allow the target data 56 in the specified session 50 to be copied as part of a copy operation. A user or program may want to use the setlock command to prevent copying of target data in a consistency session to the second data copy 5c according to the PiT copy relationship for a specific activity, such as testing or dumping to tape. The user may want to stop the copying operation to prevent the second data copy 5c from being overwritten or accidentally withdrawn until the activity has completed.

In this way, if the session copy lock 60 is set, the copy manager 12b does not allow PiT copies to be taken of the session target data 56, e.g., first data copy 5b, in the second storage 4b to the second data copy 5c. When the session copy lock 60 is set, the copy manager 12b may fail any request to establish a PiT copy between the target data 56 in the second storage 4b, e.g., first data copy 5b, and the second data copy 5c, or withdraw an existing PiT copy. The session copy lock 60 may prevent the PiT copy operation even if the session integrity lock 58 indicates that the source data at the second storage 4b is at a valid recovery point.

Figure 3:
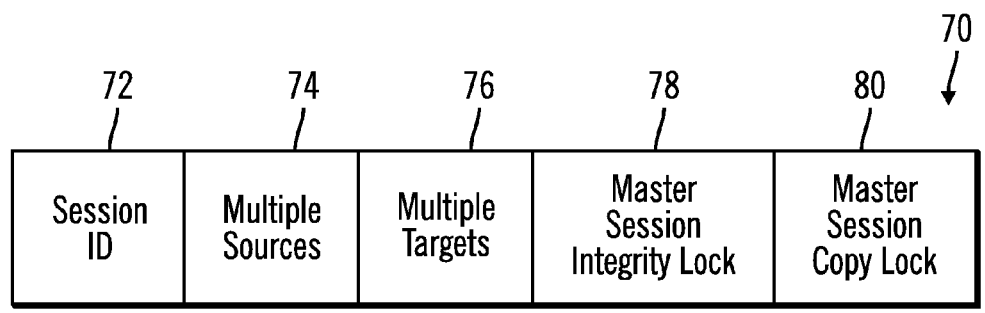
FIG. 3 illustrates an embodiment of a master session instance.

FIG. 3 illustrates a master session instance 70 maintained for one consistency session. The master sessions 18a, 18b may include a master session instance 70 for each master session established including the first 4a and second 4b storages. The master session instance 70 includes a master session identifier (ID) 72, multiple sources 74, and multiple targets 76, such that the multiple sources 74 and multiple targets 76 indicate multiple source-target pairs for copying in different storage sites that are part of the master session. The master session instance 70 further includes a master session integrity lock 78 indicating whether the data in the consistency session 52 for all the source 74 and target 76 pairs is at a valid recovery point, such as consistent as of a point-in-time and a user settable master session copy lock 80 indicating that target data in the targets 76 may not be subject to a copy operation, such as a PiT copy operation.

With a master data session, a master storage controller signals the source storage controllers, including the first controller 6a, to copy their data to the corresponding target storages 76, including the second storage 4b. The master consistency session is consistent as of a point-in-time, when all dependent writes across all the source storages 74 are copied in order to the target storages 76, so consistency is maintained among all source-target storage pairs at different sites in the master session. The master session integrity lock 78 indicates whether the data in all the source-target storage pairs is consistent.

Figure 4:
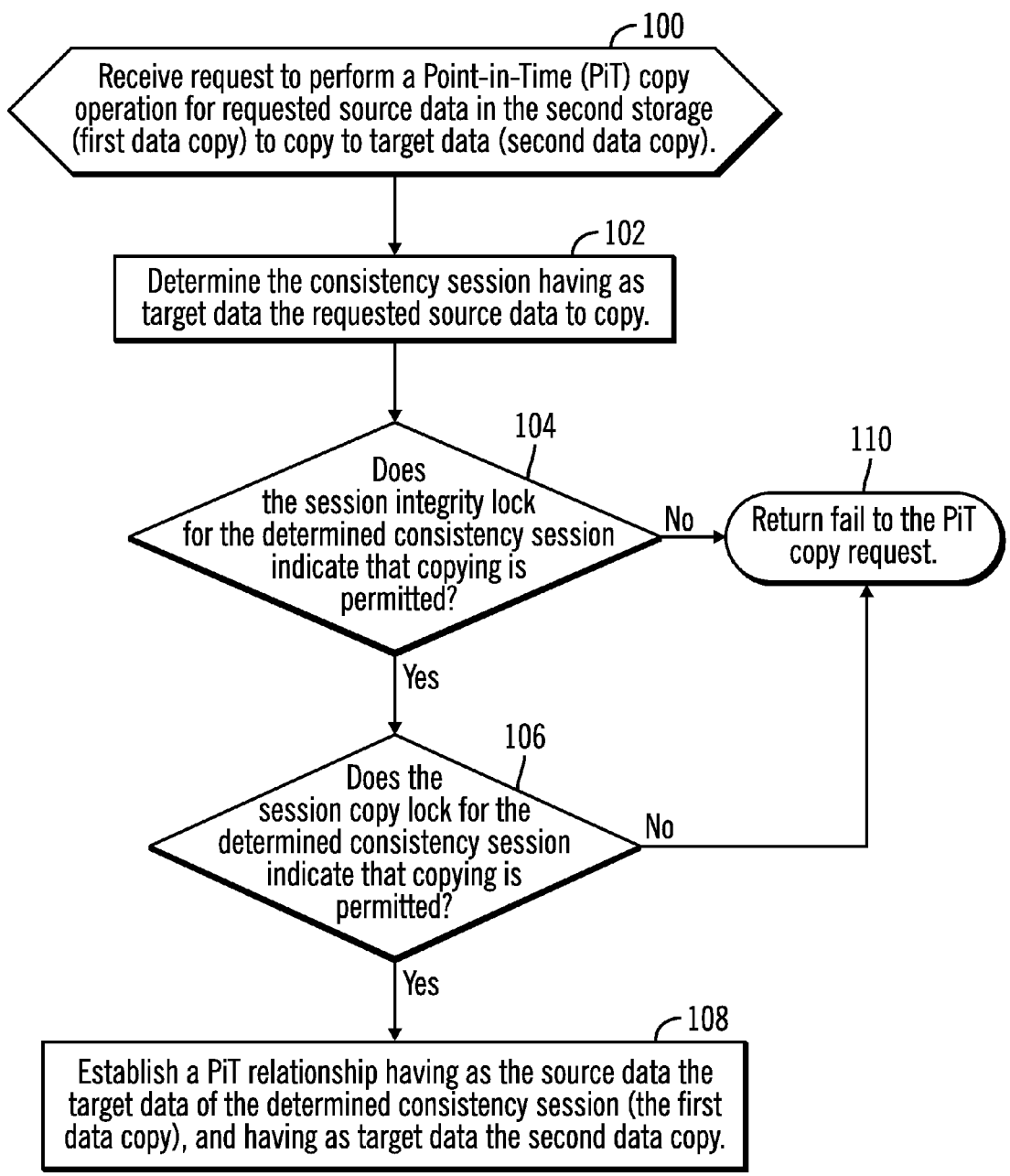
FIG. 4 illustrates an embodiment of operations to process a request to perform a PiT copy operation.

FIG. 4 illustrates an embodiment of operations performed by the copy manager 12b, in the storage controller 6b, to perform a PiT copy operation for target data 56 in a consistency session, e.g., the first data copy 5b, in the second storage 4b, to the second data copy 5c in the second storage 4b. The request may be directed to copy target data 56 in the second storage 4b that is in a consistency session 50 or master consistency session 80 to the second data copy 5c, such that the target data 56, first data copy 5b, in the consistency session is the source data for the new requested PiT copy operation. Upon receiving the request (at block 100) the copy manager 12b determines (at block 102) the consistency session 16b having as target data 56 the requested source data to copy. The copy manager 12b may determine the consistency session 16b and related session information, such as, but not limited to, the session integrity lock 58, session copy lock 60, etc., by communicating with the host copy manager 12c, accessing a copy of the consistency session 16b at the host 20 or in the storage 4b, or maintaining a local copy of the consistency session 16b information. If (at block 104) the session integrity lock 58 for the determined consistency session, whose target data 56, e.g., first data copy 5b, is subject to the PiT copy operation, then this indicates that copying is permitted, i.e., the target data 56, e.g., first data copy 5b, is at a valid recovery point, then a further determination is made (at block 106) of whether the user settable storage copy lock 60 for the consistency session indicates that copying is permitted. If both the session integrity lock 58 and the session copy lock 60 indicate that copying is permitted, then the copy manager 12b establishes (at block 108) a PiT copy relationship 20 for the target data 56, e.g., first data copy 5b, in the consistency session 50 to be the source data for the requested PiT copy operation and the requested target data, e.g., second data copy data 5c, in the second storage 4b to be the target data of the PiT copy. If either the session integrity lock 58 or the session copy lock 60 indicate that copying is not permitted, then fail is returned (at block 110) to the PiT copy request.

The operations of FIG. 4 are described with respect to a PiT copy operation attempted with respect to a first data copy 5b in the second storage 4b that is target data 56 in a consistency session receiving source data 54 from the first storage 4a. In a further embodiment, the consistency session target data 56, first data copy 5b, in the second storage 4b subject to the PiT copy operation may comprise target data that is one of multiple targets 76 in a master session 76, such that the master session integrity lock 78 does not permit copying until data is recoverable and consistent across all source-target pairs, including the first storage 4a and the second storage 4b, in the master session.

The requested PiT copy operation of FIG. 4 may comprise an operation to establish a point-in-time relationship, suspend a point-in-time copy relationship, and withdraw a point-in-time copy relationship.

Although the operations of FIG. 4 were described with respect to a PiT copy operation, the copy operation from the second storage 4b to the third storage 4c may comprise a different type of copy operation than a PiT copy, such as a full copy of all the data.

Figure 5:
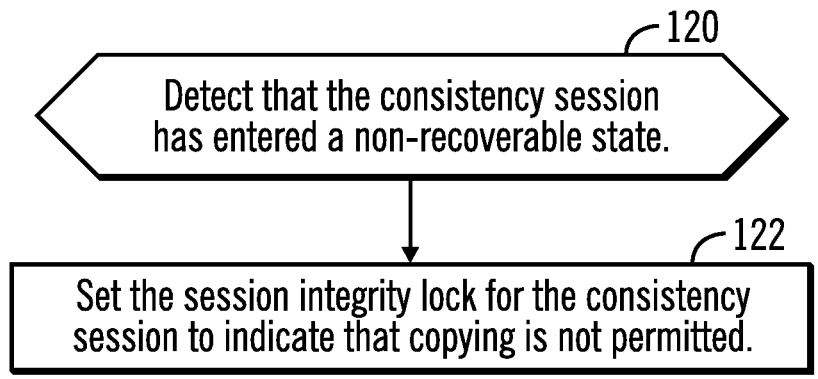
FIG. 5 illustrates an embodiment of operations to perform when detecting that the consistency session has entered a non-recoverable state.

FIG. 5 illustrates an embodiment of operations performed by the copy manager 12c in the host 20 to set the session integrity lock 58 for data in a consistency session. Upon detecting (at block 120) that a consistency session has entered a non-recoverable state, the session integrity lock 58 is set (at block 122) to indicate that copying is not permitted. As mentioned, a non-recoverable state may be detected when a synchronization or resynchronization operation is ongoing between the source data 54 in the first storage 2a and target data 56 in the second storage 2b or when an operator explicitly sets the lock 58.

Figure 6:
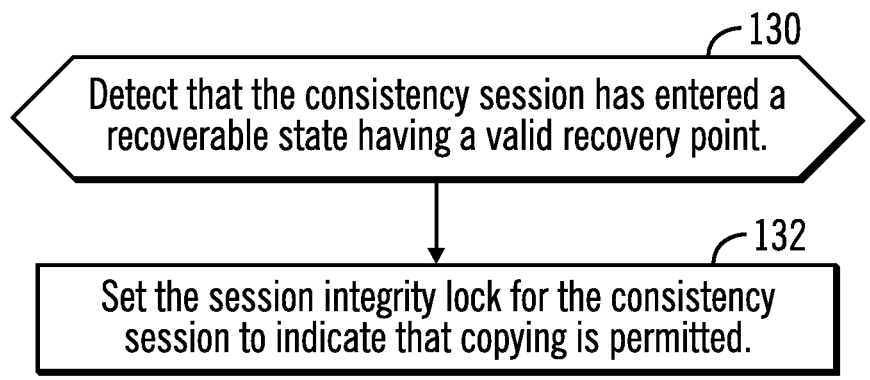
FIG. 6 illustrates an embodiment of operations to perform when detecting that the consistency session has entered a recoverable state.

FIG. 6 illustrates an embodiment of operations performed by the copy manager 12c to set the session integrity lock 58 for data in a consistency session. Upon detecting (at block 130) that a consistency session has entered a recoverable state having a valid recovery point, the session integrity lock 58 is set (at block 132) to indicate that copying is permitted. A valid recovery point that results in the setting of the session integrity lock 58 to indicate that copying is permitted may occur upon detecting that a previously initiated synchronization or resynchronization operation has completed for a session, that an operator explicitly releases the session integrity lock 56, or that a locked session is removed from the configuration.

Figure 7:
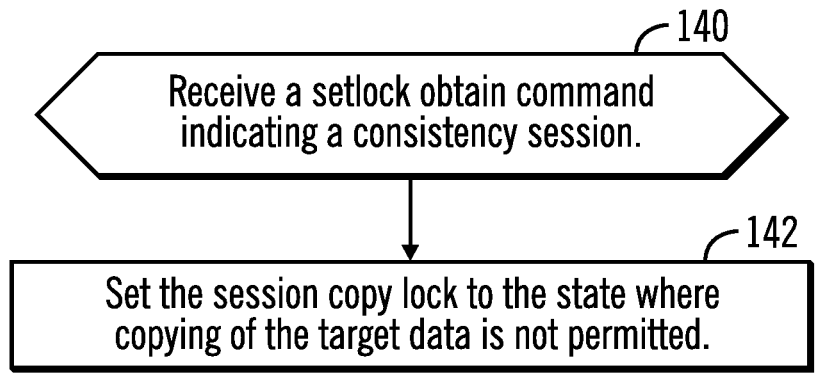
FIG. 7 illustrates an embodiment of operations to process a setlock obtain command.

FIG. 7 illustrates an embodiment of operations performed by the copy manager 12c to set the session copy lock 60 to a state indicating that copying of the target data 56, e.g., first data copy 5b, in the session is not permitted. Upon receiving (at block 140) a setlock obtain command specifying a consistency session, the copy manager 12c sets (at block 142) the session copy lock 60 for the specified consistency session to indicate that the target data 56, e.g., first data copy 5b, is in the state that does not permit copying.

A setlock release command specifying a consistency session may be submitted by a user or program to cause the copy manager 12c to set the session copy lock 60 for the specified consistency session to indicate that copying of the target data 56 is permitted.

In the described embodiments, separate copy managers 12b and 12c are shown at the secondary site 2b in a storage controller 6b and host 20, respectively. In alternative embodiments, the functions of the copy managers 12b and 12c may be implemented in one or more programs at the secondary site 20 as a single program or additional programs in either the host 20, the second controller 6b and/or additional systems.

The described embodiments provide techniques for indicating that target data in a consistency session is not permitted to be used as source data in an additional PiT copy operation to target data in the second data copy 5c. A session integrity lock is used to automatically indicate that target data, first data copy 5b, is in the state that does not permit copying if the source 5a and target 5b data in the consistency session is not at a recoverable point. A session integrity lock is settable by a user to indicate that target data in the consistency session is not to be copied such as in the case that the user is performing activity with respect to a copy of the target data in the consistency session maintained in a PiT copy relationship in the third storage.

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for copying data from a first storage to a second storage, wherein the computer program product comprises a non-transitory computer readable storage medium having computer readable program code embodied therein that executes to cause operations, the operations comprising:

performing a first copy operation to copy source data from a first location in the first storage to a first data copy at a second location in the second storage;

receiving a request to perform a second copy operation to copy requested data from the first data copy in the second storage to a second data copy, wherein the requested data comprises the first data copy of the first copy operation;

determining whether the requested first data copy is in a state that does not permit copying in response to receiving the request;

performing the second copy operation to copy the requested first data copy from the second storage to a second data copy in a third location external to the first storage in response to determining that the requested first data copy is not in the state that does not permit the copying; and denying the request in response to determining that the requested first data copy is in the state that does not permit copying.

2. The computer program product of claim 1, wherein the determining that the requested first data copy is in the state that does not permit copying comprises:

determining whether the first data copy provides a valid recovery point for the source data, wherein the requested first data copy is in the state that does not permit copying in response to determining that the first data copy does not provide a valid recovery point.

3. The computer program product of claim 1, wherein the first copy operation continuously transmits updated data that needs to be copied from the source data in the first storage to the first data copy in the second storage, and wherein the second copy operation comprises a point-in-time copy operation at the second storage.

4. The computer program product of claim 1, wherein the second copy operation copies the first data copy to the second data copy in a third storage.

5. A computer program product for copying data from a first storage to a second storage, wherein the computer program product comprises a computer readable storage medium having computer readable program code embodied therein that executes to cause operations, the operations comprising:

performing a first co operation to copy source data from the first storage to a first data copy in the second storage, wherein the source data and the first data copy are in a consistency session;

maintaining a session integrity lock for the consistency session, wherein the session integrity lock is set to indicate that the first data copy in the consistency session is in the state that does not permit copying when the data in the consistency session has entered a non-recoverable state;

receiving a request to perform a second copy operation to copy requested data from the first data copy in the second storage to a second data copy, wherein the requested data comprises the first data copy of the first copy operation;

determining whether the session integrity lock indicates that the first data copy is in the state that does not permit copying in response to receiving the request;

performing the second copy operation to copy the requested first data copy from the second storage to a second data copy in response to determining that the requested first data copy is not in the state that does not permit the copying; and denying the request in response to determining that the requested first data copy is in the state that does not permit copying.

6. The computer program product of claim 5, wherein the copying of the source data to the first data copy in the consistency session is managed by a first controller managing the first storage and a host coupled to a second controller managing the second storage, and wherein the second copy operation to copy the first data copy to the second data copy is managed by the second controller.

7. The computer program product of claim 5, wherein the operations further comprise:

determining whether a synchronization or resynchronization operation is being performed or has completed for the consistency session;

setting the session integrity lock for the consistency session to the state that does not permit copying in response to determining that the synchronization or resynchronization operation is being performed for the consistency session; and setting the session integrity lock for the consistency session to the state that permits copying in response to determining that the synchronization or resynchronization operation being performed for the consistency session has completed.

8. The computer program product of claim 5, wherein there are a plurality of sessions established between the first and the second storage managed as a master session, wherein there is a master session integrity lock to provide overall consistency across all the sessions in the master session, wherein the determining whether the requested data is in the state that does not permit copying comprises determining whether the master session integrity lock indicates that the target data including the requested data is in the state that does not permit copying.

9. The computer program product of claim 5, wherein the operations further comprising:

maintaining a session copy lock for the session indicating whether copying is permitted for the first data copy in the consistency session;

receiving an obtain command with respect to the consistency session;

setting the session copy lock to indicate that copying is not permitted for the first data copy in the consistency session in response to receiving the obtain command;

receiving a release command with respect to the consistency session;

setting the session copy lock to indicate that copying is permitted for the first data copy in the consistency session in response to receiving the release command.

10. The computer program product of claim 9, wherein the operations further comprise:

determining whether the session copy lock for the consistency session indicates that copying is permitted in response to receiving the request, wherein the first data copy is determined to be in the state that does not permit copying in response to determining that the session integrity lock indicates the state that does not permit copying or determining that the session copy lock indicates that copying is not permitted.

11. The computer program product of claim 10, wherein the obtain and release commands are sent by a user at a user interface, and wherein the first data copy is in the state that does not permit copying in response to determining that the first data copy is not at a valid recovery point, and wherein the session copy lock is capable of preventing the second copy operation when the requested data is at the valid recovery point.

12. A system for copying data from a first storage to a second storage, comprising:

a first controller managing the first storage, wherein the first controller executes code to perform a first copy operation to copy source data from a first location in the first storage to a first data copy at a second location in the second storage;

a second controller managing the second storage, wherein the second controller executes code to perform operations, the operations comprising:

receiving a request to perform a second copy operation to copy requested data from the first data copy in the second storage to a second data copy, wherein the requested data comprises the first data copy of the first copy operation;

determining whether the requested first data copy is in a state that does not permit copying in response to receiving the request;

performing the second copy operation to copy the requested first data copy from the second storage to a second data copy in a third location external to the first storage in response to determining that the requested first data copy is not in the state that does not permit the copying; and denying the request in response to determining that the requested first data copy is in the state that does not permit copying.

13. The system of claim 12, wherein the determining that the requested first data copy is in the state that does not permit copying comprises:

determining whether the first data copy provides a valid recovery point for the source data, wherein the requested first data copy is in the state that does not permit copying in response to determining that the first data copy does not provide a valid recovery point.

14. The computer program product of claim 12, wherein the first copy operation continuously transmits updated data that needs to be copied from the source data in the first storage to the first data copy in the second storage, and wherein the second copy operation comprises a point-in-time copy operation at the second storage.

15. A system for copying data from a first storage to a second storage, comprising:

a first controller managing the first storage, wherein the first controller executes code to perform a first copy operation to copy source data from the first storage to a first data copy in the second storage, wherein the source data and the first data copy are in a consistency session;

a second controller managing the second storage;

a host system coupled to the second controller, wherein the host system executes code to maintain a session integrity lock for the consistency session, wherein the session integrity lock is set to indicate that the first data copy in the consistency session is in the state that does not permit copying when the data in the consistency session has entered a non-recoverable state;

wherein the second controller executed code to perform operations, the operations comprising:

receiving a request to perform a second copy operation to copy requested data from the first data copy in the second storage to a second data copy, wherein the requested data comprises the first data copy of the first copy operation;

determining whether the session integrity lock indicates that the first data copy is in the state that does not permit copying;

performing the second copy operation to copy the requested first data copy from the second storage to a second data copy in response to determining that the requested first data copy is not in the state that does not permit the copying; and denying the request in response to determining that the requested first data copy is in the state that does not permit copying.

16. The system of claim 15, wherein the first controller communicates with the host system to perform the copying of the source data to the first data copy in the consistency session.

17. The system of claim 15, wherein the operations performed by the host system further comprise:

determining whether a synchronization or resynchronization operation is being performed or has completed for the consistency session;

setting the session integrity lock for the consistency session to the state that does not permit copying in response to determining that the synchronization or resynchronization operation is being performed for the consistency session; and setting the session integrity lock for the consistency session to the state that permits copying in response to determining that the synchronization or resynchronization operation being performed for the consistency session has completed.

18. The computer program product of claim 15, wherein the operations performed by the host system further comprise:

maintaining a session copy lock for the session indicating whether copying is permitted for the first data copy in the consistency session;

receiving an obtain command with respect to the consistency session;

setting the session copy lock to indicate that copying is not permitted for the first data copy in the consistency session in response to receiving the obtain command;

receiving a release command with respect to the consistency session;

setting the session copy lock to indicate that copying is permitted for the first data copy in the consistency session in response to receiving the release command.

* * * * *